L. P. DESTRIBATS.
APPARATUS FOR FORMING FIGURED TREADS ON TIRES.
APPLICATION FILED JULY 24, 1909.

1,007,434. Patented Oct. 31, 1911.

Witnesses:
F. George Barry,
M. Gruber

Inventor:
Louis P. Destribats
by his attorneys

UNITED STATES PATENT OFFICE.

LOUIS PETER DESTRIBATS, OF TRENTON, NEW JERSEY.

APPARATUS FOR FORMING FIGURED TREADS ON TIRES.

1,007,434.  Specification of Letters Patent.  Patented Oct. 31, 1911.

Application filed July 24, 1909. Serial No. 509,440.

*To all whom it may concern:*

Be it known that I, LOUIS PETER DESTRIBATS, a citizen of France, and resident of Trenton, in the county of Mercer and State of New Jersey, have invented a new and useful Improvement in Apparatus for Forming Figured Treads on Tires, of which the following is a specification.

This invention consists in certain improvements in the construction, form and arrangement of the several parts of an apparatus for forming figured treads on tires and it is shown herein as being constructed particularly for forming figured treads on the casings of pneumatic tires.

The object of this invention is to provide means whereby the tread of the tire may have formed thereon any desired pattern, by means of a very simple and effective apparatus so arranged that the pattern ring may be changed at pleasure without destroying the rest of the apparatus.

Figure 1:
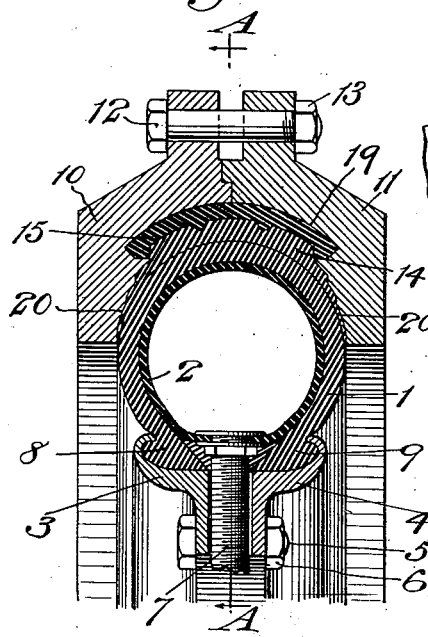
Figure 2:
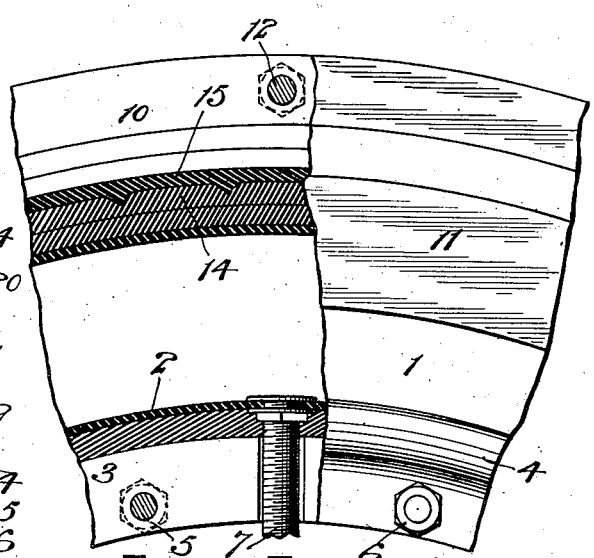
Figure 3:
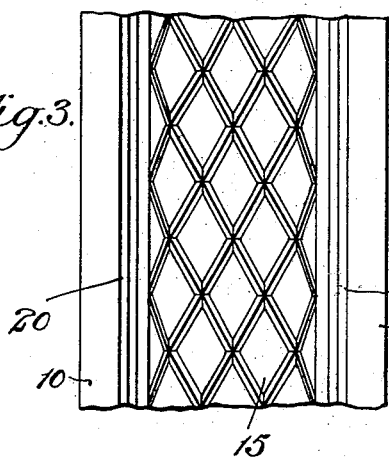
Figure 4:
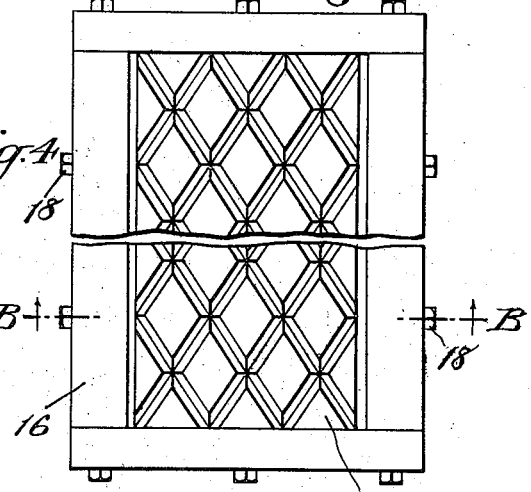
Figure 6:
Figure 5:
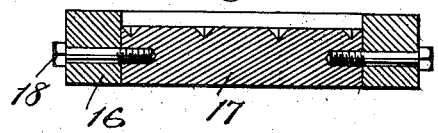

In the accompanying drawings, Figure 1 is a transverse section through a portion of the apparatus showing the same in position for use in forming a figured tread upon a pneumatic tire casing, Fig. 2 is a detail view partly in side elevation and partly in section taken in the plane of the line A—A of Fig. 1, looking in the direction of the arrows, Fig. 3 is an interior view of the apparatus with the pattern ring in place and the tire removed, Fig. 4 is a view of the flat mold for forming the flexible pattern ring, an intermediate portion of the mold being broken away, Fig. 5 is a section taken in the plane of the line B—B of Fig. 4, looking in the direction of the arrows, and Fig. 6 is a detail transverse section through the pattern ring before it is placed within its seat at the bottom of the recess in the outer mold ring.

The pneumatic tire casing is denoted by 1 and the tube for holding the same inflated during the formation of the figured tread is denoted by 2. The inner mold ring comprises two separate members 3 and 4 which may be secured together by suitable bolts 5 and their nuts 6. The valve 7 for inflating the tire casing distending tube 2 leads through the inner mold ring 3, 4. This inner mold ring serves to engage the hook flanges 8, 9, of the tire casing for retaining the tire casing in its proper position during the formation of the figured tread. The outer mold ring comprises two separable sections 10, 11, removably secured together by bolts 12 and their nuts 13. This outer mold ring is fitted to receive the tread portion 14 of the tire casing 1.

The pattern ring is denoted by 15 and it is formed of some suitable flexible material such, for instance, as vulcanized rubber. This ring 15 has formed on its inner face the desired pattern reverse of the pattern to be formed on the tire tread as, for instance, by the following apparatus:—A mold frame 16 has removably secured therein a mold 17 by suitable bolts 18 with the face of the mold a distance below the top of the frame. The face of the mold 17 is provided with the pattern which it is desired to form upon the tire tread and the mold is made of sufficient length to form a strip which will be long enough to make a complete pattern ring around the circumference of the tire tread. The pattern strip which is to form the ring is produced in the mold in its flat state. The strip is then inserted in the form of a ring within an annular seat 19 at the bottom of the annular recess 20 in the outer mold ring 10, 11, within which recess the tread of the tire is received in its semi-vulcanized condition. It is to be understood that any desired figure or pattern may be formed upon the inner face of the pattern ring 15 and transferred therefrom to the tread of the tire.

It will be seen from the above description that pattern rings bearing various designs may be inserted into the outer mold ring without destroying the mold ring members thus rendering the apparatus as a whole universal as to the pattern to be formed upon the tire tread.

What I claim is:—

1. In an apparatus for forming figured treads on tires, a vulcanized rubber pattern ring and means for holding it in position.

2. In an apparatus for forming figured treads on tires, a vulcanized rubber pattern strip bent to form a ring and means for holding it in position.

In testimony, that I claim the foregoing as my invention, I have signed my name in presence of two witnesses, this fourteenth day of July 1909.

LOUIS PETER DESTRIBATS.

Witnesses:
F. GEORGE BARRY,
C. S. SUNDGREN.